US012786100B2

(12) United States Patent
Song et al.

(10) Patent No.: US 12,786,100 B2
(45) Date of Patent: Nov. 3, 2026

(54) DATA TRANSMISSION METHOD, DATA PROCESSING METHOD, ELECTRONIC DEVICE, AND STORAGE MEDIUM

(71) Applicant: ZTE CORPORATION, Shenzhen (CN)

(72) Inventors: Xueyan Song, Shenzhen (CN); Haisheng Wu, Shenzhen (CN); Zheng Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 30 days.

(21) Appl. No.: 18/867,872

(22) PCT Filed: Apr. 4, 2023

(86) PCT No.: PCT/CN2023/086164
§ 371 (c)(1),
(2) Date: Nov. 21, 2024

(87) PCT Pub. No.: WO2024/007640
PCT Pub. Date: Jan. 11, 2024

(65) Prior Publication Data

US 2025/0350551 A1 Nov. 13, 2025

(30) Foreign Application Priority Data

Jul. 8, 2022 (CN) ......................... 202210805765.7

(51) Int. Cl.
*H04L 45/02* (2022.01)
*H04L 12/10* (2006.01)
*H04L 69/00* (2022.01)

(52) U.S. Cl.
CPC .............. *H04L 45/04* (2013.01); *H04L 12/10* (2013.01); *H04L 69/26* (2013.01)

(58) Field of Classification Search
CPC ......... H04L 45/04; H04L 12/10; H04L 69/26; H04L 45/00; H04L 67/51; H04L 67/566; H04L 67/60; H04L 69/22; H04W 72/1263
See application file for complete search history.

(56) References Cited

U.S. PATENT DOCUMENTS

2021/0083967 A1* 3/2021 Joshi .................. H04L 12/2861
2023/0214261 A1* 7/2023 Miao ..................... G06F 9/5083 718/105
2024/0022650 A1* 1/2024 Huang .................... H04L 67/63

FOREIGN PATENT DOCUMENTS

CN 113079218 A 7/2021
CN 113315700 A 8/2021
(Continued)

OTHER PUBLICATIONS

WIPO, International Search Report issued on Jul. 1, 2023.
(Continued)

*Primary Examiner* — El Hadji M Sall
(74) *Attorney, Agent, or Firm* — Li & Cai Intellectual Property (USA) Office

(57) ABSTRACT

The present disclosure provides a data transmission method, including: generating a Boarder Gateway Protocol Flow Specification (BGP-FS) protocol message carrying identification information and operation information of a computing power service; and sending the BGP-FS protocol message. The present disclosure further provides a data processing method, an electronic device, and a computer-readable medium.

10 Claims, 4 Drawing Sheets

(56) References Cited

FOREIGN PATENT DOCUMENTS

| | | | |
|---|---|---|---|
| CN | 114095579 | A | 2/2022 |
| CN | 114257544 | A | 3/2022 |
| CN | 114513457 | A | 5/2022 |
| CN | 114666262 | A | 6/2022 |
| WO | WO 2017162095 | A1 | 9/2017 |
| WO | WO 2021174237 | A2 | 9/2021 |
| WO | WO 2022028418 | A1 | 2/2022 |

OTHER PUBLICATIONS

Cao Chang, et al. "Convergence of telco cloud and bearer network based computing power network orchestration," issued on Jul. 31, 2020.

A. Farrel et al. "BGP Control Plane for the Network Service Header in Service Function Chaining," draft-ietf-bess-nsh-bgp-control-plane-17, issued on Aug. 21, 2020.

European Patent Office, the Extended European Search Report dated Jun. 5, 2025, for corresponding EP application No. 23834423.8.

S. Hares, et al., "BGP Flow Specification Version 2 draft-hares-idr-flowspec-v2-05", Internet Draft, IDR Working Group, IETF, Standardworkingdraft, INT, issued on Feb. 4, 2022.

* cited by examiner

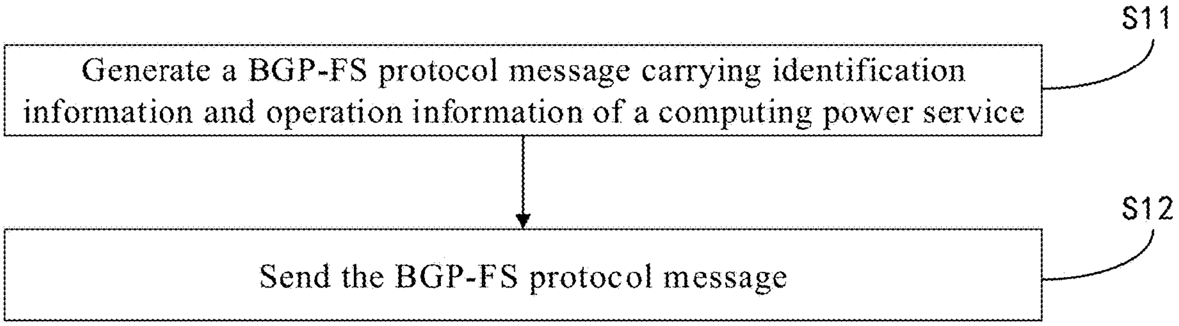
FIG. 1
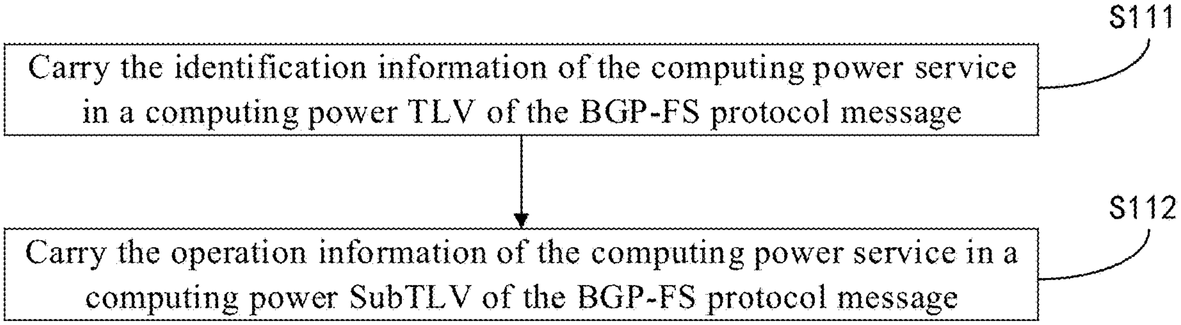
FIG. 2
```
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type  |Length| Level | AS   |          Reserved               |
+-+-+-+-+-+-+-+-+-+-+-+-+-+-+-+-+-+-+-+-+-+-+-+-+-+-+-+-+-+-+-+-+
|        Compute Power ID      |
+-+-+-+-+-+-+-+-+-+-+-+-+-+-+-+-+
```
FIG. 3

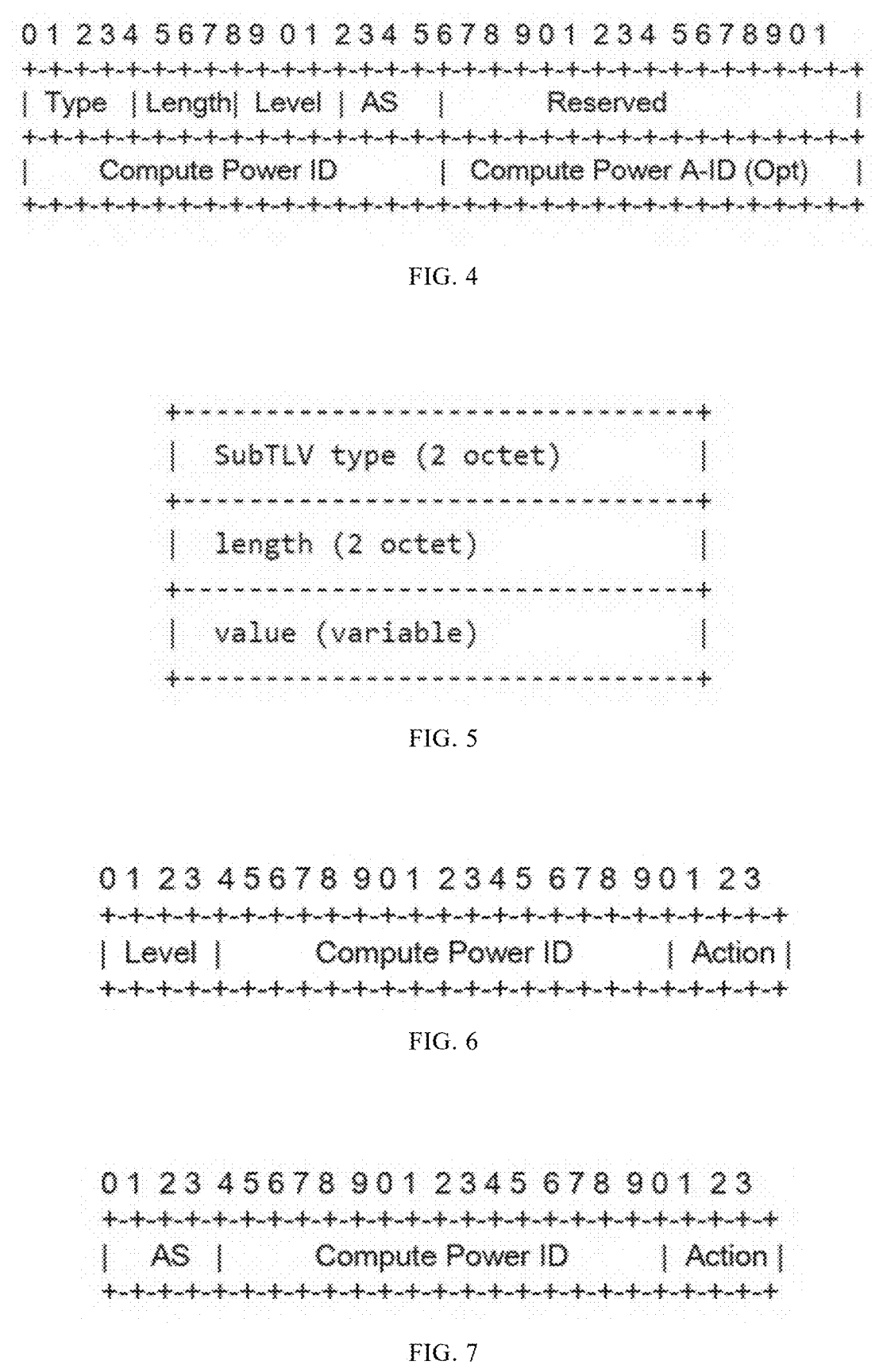

```
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type  |Length| Level | AS    |         Reserved              |
+-+-+-+-+-+-+-+-+-+-+-+-+-+-+-+-+-+-+-+-+-+-+-+-+-+-+-+-+-+-+-+-+
|      Compute Power ID        | Compute Power A-ID (Opt)      |
+-+-+-+-+-+-+-+-+-+-+-+-+-+-+-+-+-+-+-+-+-+-+-+-+-+-+-+-+-+-+-+-+
```

FIG. 4

```
+--------------------------------+
|  SubTLV type (2 octet)         |
+--------------------------------+
|  length (2 octet)              |
+--------------------------------+
|  value (variable)              |
+--------------------------------+
```

FIG. 5

```
0 1 2 3 4 5 6 7 8 9 0 1 2 3 4 5 6 7 8 9 0 1 2 3
+-+-+-+-+-+-+-+-+-+-+-+-+-+-+-+-+-+-+-+-+-+-+-+-+
| Level |      Compute Power ID        | Action |
+-+-+-+-+-+-+-+-+-+-+-+-+-+-+-+-+-+-+-+-+-+-+-+-+
```

FIG. 6

```
0 1 2 3 4 5 6 7 8 9 0 1 2 3 4 5 6 7 8 9 0 1 2 3
+-+-+-+-+-+-+-+-+-+-+-+-+-+-+-+-+-+-+-+-+-+-+-+-+
|   AS  |      Compute Power ID        | Action |
+-+-+-+-+-+-+-+-+-+-+-+-+-+-+-+-+-+-+-+-+-+-+-+-+
```

FIG. 7

```
0 1 2 3 4 5 6 7 8 9 0 1 2 3 4 5 6 7 8 9 0
+-+-+-+-+-+-+-+-+-+-+-+-+-+-+-+-+-+-+-+-+-+
|        Compute Power A-ID        | Action |
+-+-+-+-+-+-+-+-+-+-+-+-+-+-+-+-+-+-+-+-+-+
```

```
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       Network Slice ID        |     Network Slice A-ID (Opt)   |
+-+-+-+-+-+-+-+-+-+-+-+-+-+-+-+-+-+-+-+-+-+-+-+-+-+-+-+-+-+-+-+-+
| Action |    Reserved    |
+-+-+-+-+-+-+-+-+-+-+-+-+-+
```

DATA TRANSMISSION METHOD, DATA PROCESSING METHOD, ELECTRONIC DEVICE, AND STORAGE MEDIUM

CROSS-REFERENCE TO RELATED APPLICATIONS

The present disclosure is a National Phase Application filed under 35 U.S.C. 371 as a national stage of PCT/CN2023/086164 filed on Apr. 4, 2023, and claims the priority of Chinese Patent Application No. 202210805765.7, filed on Jul. 8, 2022, the contents of which are incorporated herein in their entirety by reference.

TECHNICAL FIELD

The present disclosure relates to the field of communications technologies, and in particular, to a data transmission method, a data processing method, an electronic device, and a computer-readable storage medium.

BACKGROUND

Computing power network is a novel network architecture proposed for a development trend of computing and network convergence, and enables massive applications to call computing resources in different places in real time as desired, by coordinately scheduling multidimensional resources, such as network, storage and computing power and the like, in a unified mode based on dynamically distributed computing resources being interconnected through ubiquitous network connections, so that a global optimization in connection and computing power in the network is realized, and a consistent user experience is achieved.

The architecture of the computing power network includes a computing power resource layer, a computing power routing layer and a network resource layer. For the computing power resource layer, in order to meet diverse computing expectations in the field of edge computing, a diversity computing concept is provided in the industry, and for different applications, various computing power combinations from a single-core Central Processing Unit (CPU) to a multi-core CPU, to a CPU plus a Graphics Processing Unit (GPU) plus a Field Programmable Gate Array (FPGA), and the like are proposed. For the computing power routing layer, based on abstracted computing resource discovery, by comprehensively considering conditions of the network and the computing resources, services can be flexibly scheduled to different computing resource nodes as desired. For the network resource layer, there is provided network infrastructure for information transmission, including an access network, a metropolitan area network, a backbone network and the like.

Network slicing technology is based on expectations of specific users or industry service characteristics, and on a basis of a same physical network, slices and divides physical or virtual logic network resources (such as frequency bands, equipment, ports, bandwidth and the like), so that network resources are shared or exclusive between different users/services, and a flexible allocation of the network resources is realized. According to different 5G application scenes, types of network slices supported include: Enhanced Mobile Broadband (eMBB), ultra-Reliable Low Latency (uRLLC), massive Machine Type of Communication (mMTC), Vehicle to Everything (V2X), and the like.

From an application perspective of the computing power network and the network slice, boundary nodes for a computing power service are selected through a computing power network technology, the network between the boundary nodes for the computing power service should meet various application expectations of 5G, such as eMBB, uRLLC, mMTC, V2X and the like, and different service types corresponding to the expectations are met by the slicing technology. Any sliced network may be a part of connections in a certain computing power network, or may have a range greater than that of a certain computing power network.

Currently, an effective solution for scheduling computing power services is desired.

SUMMARY

In a first aspect, the present disclosure provides a data transmission method, including: generating a Boarder Gateway Protocol Flow Specification (BGP-FS) protocol message carrying identification information and operation information of a computing power service; and sending the BGP-FS protocol message.

In a second aspect, the present disclosure provides a data processing method, including: receiving a BGP-FS protocol message; extracting identification information of a computing power service from the BGP-FS protocol message, and identifying the computing power service; and extracting operation information of the computing power service from the BGP-FS protocol message, and scheduling the computing power service.

In a third aspect, the present disclosure provides an electronic device, including: at least one processor; a memory having at least one computer program stored thereon, the at least one computer program, executed by the at least one processor, causes the at least one processor to implement at least one of: the data transmission method in the first aspect of the present disclosure; or the data processing method in the second aspect of the present disclosure.

In a fourth aspect, the present disclosure provides a computer-readable medium having a computer program stored thereon, the computer program, executed by a processor, causes the processor to implement at least one of: the data transmission method in the first aspect of the present disclosure; or the data processing method in the second aspect of the present disclosure.

BRIEF DESCRIPTION OF DRAWINGS

FIG. 1 is a flowchart of a data transmission method according to implementations of the present disclosure.

FIG. 2 is a flowchart of a part of operations in a data transmission method according to implementations of the present disclosure.

FIG. 3 is a schematic diagram of a format of a computing power TLV carrying identification information of a computing power service.

FIG. 4 is a schematic diagram of a format of a computing power TLV carrying identification information of a computing power service.

FIG. 5 is a schematic diagram of an encapsulation format of a computing power SubTLV.

FIG. 6 is a schematic diagram of an encapsulation format of a computing power SubTLV.

FIG. 7 is a schematic diagram of an encapsulation format of a computing power SubTLV.

DETAIL DESCRIPTION OF EMBODIMENTS

Figures 8, 9, 10:
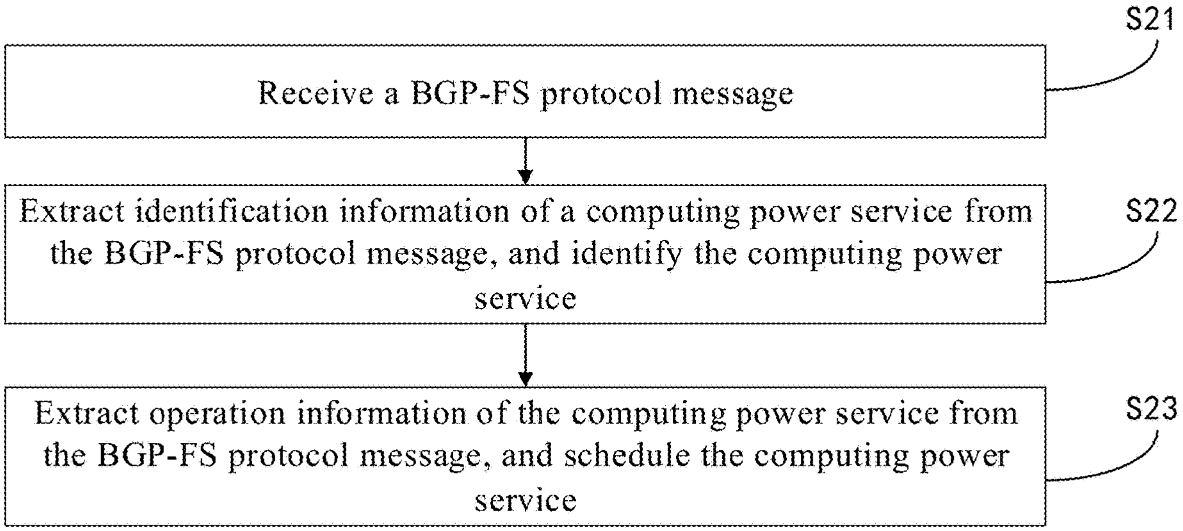
FIG. 8 is a schematic diagram of an encapsulation format of a computing power SubTLV.
FIG. 9 is a schematic diagram of an encapsulation format of a computing power SubTLV.
FIG. 10 is a flowchart of a data processing method.

In order to make those skilled in the art better understand the technical solutions of the present disclosure, a data transmission method, a data processing method, an electronic device, and a computer-readable medium, provided in the present disclosure, are described in detail below with reference to the accompanying drawings.

Exemplary embodiments are described in detail below with reference to the accompanying drawings, but the exemplary embodiments may be embodied in different forms, and the present disclosure should not be construed as limited to the embodiments set forth herein. The embodiments are provided to make the present disclosure more thorough and complete, and for those skilled in the art more fully understanding the scope of the present disclosure.

The embodiments of the present disclosure and technical features in the embodiments may be combined with each other if no conflict is incurred.

As used in the present disclosure, a term "and/or" includes any and all combinations of at least one of listed items.

The terms used in the present disclosure are for a purpose of describing particular embodiments only, and are not intended to limit the present disclosure. As used in the present disclosure, singular forms "a" and "the" include plural forms as well, i.e., to indicate at least one, unless the context clearly defines otherwise. It should further be understood that terms "includes/comprises" and/or "made of/consisted of" in the present disclosure are used to specify a presence of at least one of recited features, integers, steps, operations, elements or components, but do not preclude a presence or an addition of at least one of other features, integers, steps, operations, elements, components or groups thereof.

Unless otherwise defined, meanings of all terms (including technical terms and scientific terms) used herein are the same as meanings commonly understood by one of ordinary skills in the art. It should further be understood that terms, such as those defined in common dictionaries, should be construed as having a meaning that is consistent with that in background of the existing art and the present disclosure, and should not be construed as having an idealized or over-formal meaning, unless expressly defined in the present disclosure.

Boarder Gateway Protocol Flow Specification (BGP-FS), also known as BGP FlowSpec, is defined in RFC 5575. RFC 5575 defines a new Multi-Protocol BGP (MP-BGP) extension and introduces new Network Layer Reachability Information (NLRI). The new NLRI collects twelve details of layer 3 and layer 4 for defining the flow specification, and then assigns actions to the routes according to user's expectations. FlowSpec may be considered as a firewall filter injected into BGP for filtering specific ports and protocols, and is similar to an Access Control List (ACL). BGP exchanges routing information between BGP nodes by using the NLRI, each MP-BGP extension has its own NLRI information, and is identified by an Address Family Identifier (AFI) and a Subsequent Address Family Identifier (SAFI). Usually, Internet Protocol version 4 (IPv4) unicast routes (also called BGP family) are default routes of BGP peers, and if non-IPv4 unicast routes, such as IPV6 routes, Ethernet Virtual Private Network (EVPN) routes, L2VPN routes, FlowSpec routes, are exchanged, the MP-BGP defines relevant NLRI of a router, the NLRI should have a next hop of a destination family. BGP FlowSpec V1 (RFC8955, 8956) defines 12 NLRI types, which are added in an NLRI field of a BGP Update Message and announced to the peers. In subsequent deployments of BGP FlowSpec V1, since there is the flow Specification, a consistent Type Length Value (TLV) coding specification, user's ordering for filtering rules and/or operations, and well-defined support of FSv1 for interacting with BGP peers are lacked.

The implementations of the present disclosure aim to realize identification and processing on the computing power service flow through a BGP-FS protocol.

In a first aspect, referring to FIG. 1, the implementations of the present disclosure provide a data transmission method, including following operation S11 and S12.

At operation S11, generating a BGP-FS protocol message carrying identification information and operation information of a computing power service.

At operation S12, sending the BGP-FS protocol message.

In the implementations of the present disclosure, the identification information of the computing power service has uniqueness and traceability in a computing power network resource pool. With the identification information of the computing power service, an access time, an operation condition and a full life cycle of computing power can be managed.

In the implementations of the present disclosure, the operation information of the computing power service defines action information for scheduling the computing power, so as to realize operations such as scheduling the computing power, selecting a computing power route.

In the implementations of the present disclosure, the identification information and the operation information of the computing power service are carried in the BGP-FS protocol message, so that the computing power service can be identified and scheduled, and on a basis of ensuring computing power performance, expectations of users on deterministic services can be met.

How to carry the identification information and the operation information of the computing power service in the BGP-FS protocol message is not particularly limited in the implementations of the present disclosure.

FIG. 2 is a flowchart of a part of operations in a data transmission method according to the present disclosure, and referring to FIG. 2, in some implementations, the generating a BGP-FS protocol message includes following operations S111 and S112.

At operation S111, carrying the identification information of the computing power service in a computing power TLV of the BGP-FS protocol message.

At operation S112, carrying the operation information of the computing power service in a computing power SubTLV of the BGP-FS protocol message.

In some implementations, for carrying the identification information and the operation information of the computing power service in the BGP-FS protocol message, a BGP-FS coding format of <Type (1 octet), Length (1 octet), [operator, value]+> is adopted, Type is a field with a length of one byte, and is configured for indicating a component type; Length is a field with a length of one byte, and is configured for indicating a length of [operator, value]+; [operator, value]+ includes a series of [operator, value], and is configured for indicating information carried by the computing power service.

In the implementations of the present disclosure, a format of the computing power TLV carrying the identification information of the computing power service is not particularly limited.

In some implementations, the computing power TLV includes: a field of Type for indicating a type of the computing power service; a field of Length for indicating a length of a field of computing power identifier; a field of Level for identifying a level of the computing power service; a field of autonomous system (AS) for identifying information of a region where computing power resources are located; a field of computing power identifier (Compute Power ID) for carrying information of the computing power service; a field of Reserved.

In some implementations, as shown in FIG. 3, an encapsulation format of a field of Value of the computing power TLV carrying the identification information of the computing power service includes following fields of Type, Length, Level, AS, Reserved and Compute Power ID.

Type is a field with a length of 4 bits, and configured for indicating a type of the computing power service, such as CPU, GPU, or other types of computing power resources.

Length is a field with a length of 4 bits, and configured for indicating a length of a field of Compute Power ID.

Level is a field with a length of 4 bits, configured for indicating a level of the computing power service, and may be set according to that priority 0 is the highest and priority 1111 is the lowest, so as to realize scheduling of computing power services with different priorities.

AS is a field with a length of 4 bits, and configured for identifying information of a region where the computing power resources are located.

Reserved is a field with a length of 2 bytes, configured for future use.

Compute Power ID is a field with a length of 2 bytes, configured for carrying detailed information of the computing power service.

In some implementations, an aggregation of multiple computing power networks is realized through computing power aggregation, and by expanding a flexible deployment of computing power, and hierarchically deploying the computing power, computing power resources can be scheduled with different granularities, so that flexible scheduling of computing power resources for users is realized.

In some implementations, the computing power TLV further includes a field of aggregated computing power identifier (Compute power A-ID) for identifying aggregated computing power.

In some implementations, as shown in FIG. 4, an encapsulation format of the field of Value of the computing power TLV carrying the identification information of the computing power service includes following fields of Type, Length, Level, AS, Reserved, Compute Power ID and Compute Power A-ID.

Type is a field with a length of 4 bits, and configured for indicating a type of the computing power service, such as CPU, GPU, or other types of computing power resources.

Length is a field with a length of 4 bits, and configured for indicating a length of a field of Compute Power ID.

Level is a field with a length of 4 bits, configured for indicating a level of the computing power service, and may be set according to that priority 0 is the highest and priority 1111 is the lowest, so as to realize scheduling of computing power services with different priorities.

AS is a field with a length of 4 bits, and configured for identifying information of a region where the computing power resources are located.

Reserved is a field with a length of 2 bytes, and configured for future use.

Compute Power ID is a field with a length of 2 bytes, and configured for carrying detailed information of the computing power service.

Compute Power A-ID (optional) is an optional field configured to identify aggregated computing power.

An encapsulation format of the computing power SubTLV is not particularly limited in the implementations of the present disclosure.

In some implementations, the computing power SubTLV includes: a field of SubTLV type for indicating a mapping of different service types; a field of Length for indicating a length of the computing power SubTLV; and a field of Value for indicating a content of an operation.

In some implementations, as shown in FIG. 5, the encapsulation format of the computing power SubTLV includes following fields of SubTLV type, Length, and Value.

SubTLV type is a field with a length of 2 bytes, and configured for indicating a mapping of different service types.

Length is a field with a length of 2 bytes, and configured for indicating a length of the field of computing power SubTLV.

Value is a field with a length of 2 bytes, and configured for indicating a content of an operation.

In some implementations, scheduling for the computing power with different service levels is implemented. After matching the identified type of computing power service, the BGP-FS further identifies Level information in the computing power TLV, reads a priority of the computing power service, applies strategies corresponding to the Level according to strategy configurations of a management plane for different levels of computing power services, occupies expected computing power resources, and guides a service message to a corresponding computing power channel. For an IPV6 type encapsulation data message, a SubTLV type defined by IETF is adopted to perform operations, such as labeling, redirection, or Multi-Protocol Label Switching (MPLS) on the message.

In some implementations, the operation information of the computing power service includes action information scheduled based on a computing power level; the field of Value of the computing power SubTLV includes: a field of Level for carrying priority information of the computing power service; a field of Compute Power ID for matching a computing power identifier; a field of Action for specifying a corresponding action after the computing power service being matched.

In some implementations, a BGP-FSv2 computing power Action Type is provided, and with support by BGP extended group attributes, an Action for identifying the level of the computing power service is defined as computing power SubTLV Type1, and a corresponding traffic Action operation is executed by identifying the level corresponding to the computing power service.

As shown in FIG. 6, a definition format of the field of Value of the computing power SubTLV Type1 includes following fields of Level, Compute Power ID, and Action.

Level is a field with a length of 4 bits, configured for encapsulating priority information of the computing power, to be identified according to a priority sequence from high to low.

Compute Power ID is a field with a length of 2 bytes, configured for matching the computing power identifier.

Action is a field with a length of 4 bits, configured for specifying a corresponding action after the computing power service being matched, with 0 corresponding to Reserved, and 1 corresponding to an action of Copy/Redirect Copy.

A sequence of operations is that the computing power level is first matched, then Compute Power ID is matched, and then a corresponding Action operation is executed.

In some implementations, after identifying the type of the computing power service through BGP-FS, AS information is further identified, and by identifying the AS information, splicing of computing power resources in different AS domains is achieved.

In some implementations, the operation information of the computing power service includes action information scheduled based on a computing power region; the field of Value of the computing power SubTLV includes: a field of AS for carrying autonomous system information; a field of Compute Power ID for matching a computing power identifier; a field of Action for specifying a corresponding action after the computing power service being matched.

In some implementations, a BGP-FS computing power Action Type is provided, and with support by BGP extended group attributes, an Action for identifying AS of the computing power service is defined as computing power SubTLV Type2, by performing splicing, mapping or other operations on computing power resources in different AS domains, splicing or merging of the computing power resources in different AS domains is achieved, so that an end-to-end deployment of the computing power resources is realized.

As shown in FIG. 7, a definition format of the field of Value of the computing power SubTLV Type2 includes following fields of AS, Compute Power ID, and Action.

AS is a field with a length of 4 bits, configured for encapsulating AS information.

Compute Power ID is a field with a length of 2 bytes, configured for matching the computing power identifier.

Action is a field with a length of 4 bits, configured for specifying a corresponding action after the computing power service being matched, with 0 corresponding to Reserved, and 1 corresponding to an action of Copy and Binding Copy.

A sequence of operations is that AS is first matched, then Compute Power ID is matched, and then a corresponding Action operation is executed.

In some implementations, after the aggregated computing power identifier is identified through the BGP-FS, a corresponding single computing power network is subjected to a binding operation, e.g., a user computing power service is bound to an industry computing power service group.

In some implementations, the operation information of the computing power service includes action information scheduled based on aggregated computing power; the field of Value of the computing power SubTLV includes: a field of Compute power A-ID for matching an aggregated computing power identifier; a field of Action for specifying a corresponding action after the computing power service being matched.

In some implementations, a BGP-FSv2 computing power Action Type is provided, and with support by BGP extended group attributes, an Action for identifying the computing power service is defined as computing power SubTLV Type3, by mapping single computing power to aggregated computing power, mapping or merging of different computing power resources is achieved.

As shown in FIG. 8, a definition format of the field of Value of the computing power SubTLV Type3 includes following fields of Compute Power A-ID and Action.

Compute Power A-ID is a field with a length of 2 bytes, configured for matching the aggregated computing power identifier.

Action is a field with a length of 4 bits, configured for specifying a corresponding action after the computing power service being matched, with 2 corresponding to Reserved, and 3 corresponding to an action of Copy/Redirect Copy.

A sequence of operations is that Compute Power A-ID is first matched, and then a corresponding Action operation is executed.

In some implementations, the computing power network provides guarantee for the computing power resources, the network slice provides network resource services meeting specific expectations of users, and by cooperatively using the sliced network and the computing power network, on the basis of ensuring the computing power performance, specific network service expectations of users can be met.

In some implementations, the operation information of the computing power service includes action information of a mapping from the computing power service to a network slice; the field of Value of the computing power SubTLV includes: a field of AS for carrying autonomous system information; a field of Network Slice ID for matching an identifier of a network slice; a field of Action for specifying a corresponding action after the computing power service being matched.

In some implementations, the field of Value of the computing power SubTLV further includes a field of Network Slice A-ID for matching an identifier of an aggregated network slice.

In some implementations, a BGP-FSv2 computing power Action SubTLV encapsulation is provided, and with support by BGP extended group attributes, an Action for identifying the level of the computing power service is defined as computing power SubTLV Type4, and is configured for redirecting and binding a computing power network service to a network slice service.

As shown in FIG. 9, an extended group attribute format of the computing power SubTLV Type4 includes following fields of AS, Network Slice ID, Network Slice A-ID and Action.

AS is a field with a length of 4 bits, configured for encapsulating AS information.

Network Slice ID is a field with a length of 2 bytes, configured for matching an identifier of a network slice.

Network Slice A-ID is an optional field with a length of 2 bytes, configured for matching an identifier of an aggregated network slice.

Action is a field with a length of 4 bits, configured for specifying a corresponding action after the computing power service being matched, with 0 corresponding to Reserved, and 1 corresponding to an action of Copy/Redirect Copy.

A sequence of operations is that Compute Power ID/Compute Power A-ID is first mapped with a slice, and then a corresponding Action operation is executed.

In a second aspect, referring to FIG. 10, the implementations of the present disclosure provide a data processing method, including following operations S21 to S23.

At operation S21, receiving a BGP-FS protocol message.

At operation S22, extracting identification information of a computing power service from the BGP-FS protocol message, and identifying the computing power service.

At operation S23, extracting operation information of the computing power service from the BGP-FS protocol message, and scheduling the computing power service.

In some implementations, the extracting identification information of a computing power service from the BGP-FS protocol message includes: extracting the identification information of the computing power service from a computing power TLV of the BGP-FS protocol message.

In some implementations, the identifying the computing power service includes: matching the computing power service according to a field of computing power identifier in the computing power TLV; identifying a type of the computing power service according to a field of Type in the computing power TLV; identifying a level of the computing power service according to a field of Level in the computing power TLV; identifying a region attribute of the computing power service according to a field of autonomous system in the computing power TLV.

In some implementations, the identifying the computing power service further includes: identifying an aggregation attribute of the computing power service according to a field of aggregated computing power identifier in the computing power TLV.

In some implementations, the extracting operation information of the computing power service from the BGP-FS protocol message includes: extracting the operation information of the computing power service from a computing power SubTLV of the BGP-FS protocol message.

In some implementations, the extracting the operation information of the computing power service from a computing power SubTLV of the BGP-FS protocol message includes: extracting a mapping of a service type of the computing power service from a field of SubTLV type of the computing power SubTLV; extracting the operation information of the computing power service from a field of Value of the computing power SubTLV.

In some implementations, the operation information of the computing power service includes action information scheduled based on a computing power level; the scheduling the computing power service includes: matching a level of the computing power service according to a field of Level in the field of Value of the computing power SubTLV; matching a computing power identifier according to a field of computing power identifier in the field of Value of the computing power SubTLV; executing an action scheduled based on the computing power level according to a field of Action in the field of Value of the computing power SubTLV.

In some implementations, the operation information of the computing power service includes action information scheduled based on a computing power region; the scheduling the computing power service includes: matching an autonomous system according to a field of autonomous system in the field of Value of the computing power SubTLV; matching a computing power identifier according to a field of computing power identifier in the field of Value of the computing power SubTLV; executing an action scheduled based on the computing power region according to a field of Action in the field of Value of the computing power SubTLV.

In some implementations, the operation information of the computing power service includes action information scheduled based on aggregated computing power; the scheduling the computing power service includes: matching an identifier of an aggregated computing power according to a field of aggregated computing power identifier in the field of Value of the computing power SubTLV; executing an action scheduled based on the aggregated computing power according to a field of Action in the field of Value of the computing power SubTLV.

In some implementations, the operation information of the computing power service includes action information of a mapping from the computing power service to a network slice; the scheduling the computing power service includes: identifying the mapping between the computing power service and the network slice according to a field of network slice identifier in the field of Value of the computing power SubTLV; identifying a mapping between aggregated computing power and an aggregated network slice according to a field of aggregated network slice identifier in the field of Value of the computing power SubTLV; executing an action of mapping from the computing power service to the network slice according to a field of Action in the field of Value of the computing power SubTLV.

Figure 11:
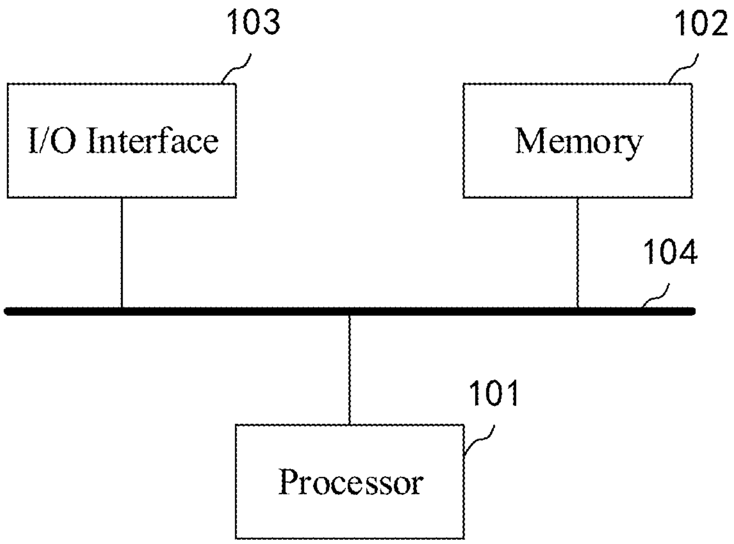
FIG. 11 is a block diagram of an electronic device according to implementations of the present disclosure.

In a third aspect, referring to FIG. 11, the implementations of the present disclosure provide an electronic device, including: at least one processor 101; a memory 102 having at least one computer program stored thereon, the at least one computer program, executed by the at least one processor, causes the at least one processor to implement at least one of the data transmission method in the first aspect of the present disclosure, or the data processing method in the second aspect of the present disclosure; and at least one I/O interface 103 connected between the processor and the memory, and configured to implement information interaction between the processor and the memory.

The processor 101 is a device having a capability of processing data, includes, but is not limited to, a Central Processing Unit (CPU), and the like; the memory 102 is a device having a capability of storing data, includes, but is not limited to, a random access memory (RAM, in particular, SDRAM, DDR, and the like), a read only memory (ROM), an electrically erasable programmable read only memory (EEPROM), and a FLASH; the I/O interface (read/write interface) 103 is connected between the processor 101 and the memory 102, enables to implement information interaction between the processor 101 and the memory 102, and includes, but is not limited to, a data Bus, and the like.

In some implementations, the processor 101, the memory 102, and the I/O interface 103 are connected together through a bus 104, and are further connected to other components of a computing device.

Figure 12:
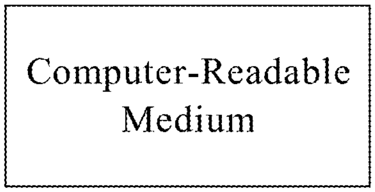
FIG. 12 is a block diagram of a computer-readable medium according to implementations of the present disclosure.

In a fourth aspect, referring to FIG. 12, the implementations of the present disclosure provide a computer-readable medium having a computer program stored thereon, the computer program, executed by a processor, causes the processor to implement at least one of: the data transmission method in the first aspect of the present disclosure; or the data processing method in the second aspect of the present disclosure.

In order to make the technical solutions provided by the implementations of the present disclosure more clearly understood by those skilled in the art, the technical solutions provided by the implementations of the present disclosure are described in detail below by referring to specific examples.

EXAMPLE 1

A computing power identifier, as a key value of an index of a computing power resource model, is matched with uniqueness and traceability of computing power in an entire computing power network resource pool. Through the computing power identifier, an access time, an operation condition and a full life cycle of computing power can be managed, and operations such as scheduling the computing power, selecting a computing power route are realized.

In the Example, the computing power identifier is matched by BGP-FS, and further identification and service scheduling for a computing power service are achieved.

In the Example, computing power information is carried by adopting a BGP-FS coding format of <Type (1 octet), Length (1 octet), [operator, value]+>.

Type is a field with a length of 1 byte, and configured for indicating a component type.

Length is a field with a length of 1 byte, and configured for indicating a length of [operator, value]+.

The [operator, value]+ is including a series of [operator, value], and configured for indicating information carried by the computing power service.

FIG. 3 shows a format of a computing power TLV carrying the computing power identifier, including following fields of Type, Length, Level, AS, Reserved and Compute Power ID.

Type is a field with a length of 4 bits, and configured for indicating a type of the computing power service, such as CPU, GPU, or other types of computing power resources.

Length is a field with a length of 4 bits, and configured for indicating a length of a field of Compute Power ID.

Level is a field with a length of 4 bits, configured for indicating a level of the computing power service, and may be set according to that priority 0 is the highest and priority 1111 is the lowest, so as to realize scheduling of computing power services with different priorities.

AS is a field with a length of 4 bits, and configured for identifying information of a region where the computing power resources are located.

Reserved is a field with a length of 2 bytes, and configured for future use.

Compute Power ID is a field with a length of 2 bytes, and configured for carrying detailed information of the computing power service.

EXAMPLE 2

In order to realize flexible scheduling of computing power resources of users, the Example provides a concept of computing power aggregation, so that an aggregation of multiple computing power networks is realized through the computing power aggregation, and a flexible deployment of computing power is expanded. By hierarchically deploying the computing power, computing power resources can be scheduled with different granularities. FIG. 4 shows a format of a field of Value carrying an aggregated computing power identifier, including following fields of Type, Length, Level, AS, Reserved, Compute Power ID and Compute Power A-ID.

Type is a field with a length of 4 bits, and configured for indicating a type of the computing power service, such as CPU, GPU, or other types of computing power resources.

Length is a field with a length of 4 bits, and configured for indicating a length of a field of Compute Power ID.

Level is a field with a length of 4 bits, configured for indicating a level of the computing power service, and may be set according to that priority 0 is the highest and priority 1111 is the lowest, so as to realize scheduling of computing power services with different priorities.

AS is a field with a length of 4 bits, and configured for identifying information of a region where the computing power resources are located.

Reserved is a field with a length of 2 bytes, and configured for future use.

Compute Power ID is a field with a length of 2 bytes, and configured for carrying detailed information of the computing power service.

Compute Power A-ID (optional) is an optional field configured to identify the aggregated computing power.

EXAMPLE 3

As shown in FIG. 5, the Example adopts a SubTLV encapsulation format defined by BGP-FSv2 for carrying Action information, including following fields of SubTLV type, Length, and Value.

SubTLV type is a field with a length of 2 bytes, and configured for indicating a mapping of different service types.

Length is a field with a length of 2 bytes, and configured for indicating a length of the field of computing power SubTLV.

Value is a field with a length of 2 bytes, and configured for indicating a content of an operation.

EXAMPLE 4

The Example provides scheduling of the computing power at different service levels. After matching the identified type of the computing power service, the BGP-FS further identifies Level information in the computing power TLV, reads a priority of the computing power service, applies strategies corresponding to the Level according to strategy configurations of a management plane for different levels of computing power services, occupies expected computing power resources, and guides a service message to a corresponding computing power channel.

In the Example, a BGP-FSv2 computing power Action Type is provided, and with support by BGP extended group attributes, an Action for identifying the level of the computing power service is defined as computing power SubTLV Type1, and a corresponding traffic Action operation is executed by identifying the level corresponding to the computing power service.

FIG. 6 shows a definition format of a field of Value of the computing power SubTLV Type1, including following fields of Level, Compute Power ID and Action.

Level is a field with a length of 4 bits, and configured for encapsulating priority information of the computing power, to be identified and processed according to a priority sequence from high to low.

Compute Power ID is a field with a length of 2 bytes, and configured for matching the computing power identifier.

Action is a field with a length of 4 bits, and configured for specifying a corresponding action after the computing power service being matched, with 0 corresponding to Reserved, and 1 corresponding to an action of Copy/Redirect Copy.

A sequence of operations is that the computing power level is first matched, then Compute Power ID is matched, and then a corresponding Action operation is executed.

EXAMPLE 5

In the Example, after identifying the type of the computing power service through BGP-FS, AS information is further identified, and by identifying the AS information, splicing of computing power resources in different AS domains is achieved.

In the Example, a BGP-FS computing power Action Type is provided, and with support by BGP extended group attributes, an Action for identifying AS of the computing power service is defined as computing power SubTLV Type2, by performing splicing, mapping or other operations on computing power resources in different AS domains, splicing or merging of the computing power resources in different AS domains is achieved, so that an end-to-end deployment of the computing power resources is realized.

FIG. 7 shows a definition format of a field of Value of the computing power SubTLV Type2, including following fields of AS, Compute Power ID and Action.

AS is a field with a length of 4 bits, and configured for encapsulating AS information.

Compute Power ID is a field with a length of 2 bytes, and configured for matching the computing power identifier.

Action is a field with a length of 4 bits, and configured for specifying a corresponding action after the computing power service being matched, with 0 corresponding to Reserved, and 1 corresponding to an action of Copy and Binding Copy.

A sequence of operations is that AS is matched first, then Compute Power ID is matched, and then a corresponding Action operation is executed.

EXAMPLE 6

In the Example, after the aggregated computing power identifier is identified through the BGP-FS, a corresponding single computing power network is subjected to a binding operation, e.g., a user computing power service is bound to an industry computing power service group.

In the Example, a BGP-FSv2 computing power Action Type is provided, and with support by BGP extended group attributes, an Action for identifying the computing power service is defined as computing power SubTLV Type3, by mapping single computing power to aggregated computing power, mapping or merging of different computing power resources is achieved.

FIG. 8 shows a definition format of a field of Value of the computing power SubTLV Type3, including following fields of Compute Power A-ID and Action.

Compute Power A-ID is a field with a length of 2 bytes, and configured for matching the aggregated computing power identifier.

Action is a field with a length of 4 bits, and configured for specifying a corresponding action after the computing power service being matched, with 2 corresponding to Reserved, and 3 corresponding to an action of Copy/Redirect Copy.

A sequence of operations is that Compute Power A-ID is first matched, and then a corresponding Action operation is executed.

EXAMPLE 7

In the Example, the computing power network provides guarantee for the computing power resources, the network slice provides network resource services meeting specific expectations of users, and by cooperatively using the sliced network and the computing power network, on the basis of ensuring the computing power performance, specific network service expectations of users can be met.

In the Example, a BGP-FSv2 computing power Action SubTLV encapsulation is provided, and with support by BGP extended group attributes, a computing power Action for identifying the network slice is defined as computing power SubTLV Type4, and is configured for redirecting and binding a computing power network service to a network slicing service.

FIG. 9 shows an extended group attribute format of the computing power SubTLV Type4, including following fields of AS, Network Slice ID, Network Slice A-ID and Action.

AS is a field with a length of 4 bits, and configured for encapsulating AS information.

Network Slice ID is a field with a length of 2 bytes, and configured for matching a network slice identifier.

Network Slice A-ID is an optional field with a length of 2 bytes, and configured for matching an aggregated network slice identifier.

Action is a field with a length of 4 bits, and configured for specifying a corresponding action after the computing power service being matched, with 0 corresponding to Reserved, and 1 corresponding to an action of Copy/Redirect Copy.

A sequence of operations is that Compute Power ID/Compute Power A-ID is first mapped with the slice, and then a corresponding Action operation is executed.

In the implementations of the present disclosure, based on the BGP-FS protocol, the transmitting terminal enables the identification information and the operation information of the computing power service to be carried in the BGP-FS protocol message, the receiving terminal can identify the computing power service according to the identification information of the computing power service in the BGP-FS protocol message, and schedules the computing power service according to the operation information of the computing power service in the BGP-FS protocol message, so that on the basis of ensuring the computing power performance, expectations of users on deterministic services can be met.

It should be understood by those of ordinary skill in the art that all or some of the operations in the method described above, or the functional modules/components in the device described above may be implemented as software, firmware, hardware, or suitable combinations thereof. In a hardware implementation, the division between the functional modules/components stated above does not correspond to the division of physical components; for example, one physical component may have a plurality of functions, or one function or operation may be performed through a cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, the computer-readable medium may include computer storage medium (or non-transitory medium) and communication medium (or transitory medium). As known to those skilled in the art, the computer storage medium includes volatile/nonvolatile v or removable/non-removable medium used in any method or technology for storing information (such as computer-readable instructions, data structures, program modules and other data). The computer storage medium includes, but is not limited to, RAM, ROM, EEPROM, a flash memory or other memory techniques, CD-ROM, a Digital Video Disk (DVD) or other optical discs, magnetic cassettes, magnetic tapes, magnetic disks or other magnetic storage devices, or any other medium which can be used to store the desired information and can be accessed by a computer. In addition, as known to those skilled in the art, the communication medium generally includes computer-readable instructions, data structures, program modules or other data in a modulated data signal, such as a carrier wave or other transmission mechanism, and may include any information delivery medium.

The present disclosure illustrates the exemplary embodiments, and although specific terms are employed, they are used and should only be interpreted in a generic and descriptive meaning but not for purposes of a limitation. In some examples, it is apparent to those skilled in the art that features, characteristics and/or elements described in connection with specific embodiments may be used alone or in combination with features, characteristics and/or elements described in connection with other embodiments, unless explicitly stated otherwise. Therefore, it should be understood by those skilled in the art that various changes in form and details may be made without departing from the scope of the present disclosure as set forth in the appended claims.

What is claimed is:

1. A data processing method, comprising:

receiving a BGP-FS protocol message;

extracting identification information of a computing power service from the BGP-FS protocol message, and identifying the computing power service; and extracting operation information of the computing power service from the BGP-FS protocol message, and scheduling the computing power service.

2. The data processing method of claim 1, wherein the extracting identification information of a computing power service from the BGP-FS protocol message comprises:

extracting the identification information of the computing power service from a computing power TLV of the BGP-FS protocol message.

3. The data processing method of claim 2, wherein the identifying the computing power service comprises:

matching the computing power service according to a field of computing power identifier in the computing power TLV;

identifying a type of the computing power service according to a field of type in the computing power TLV;

identifying a level of the computing power service according to a field of level in the computing power TLV;

identifying a region attribute of the computing power service according to a field of autonomous system in the computing power TLV;

identifying an aggregation attribute of the computing power service according to a field of aggregated computing power identifier of the computing power TLV.

4. The data processing method of claim 1, wherein the extracting operation information of the computing power service from the BGP-FS protocol message comprises:

extracting the operation information of the computing power service from a computing power SubTLV of the BGP-FS protocol message.

5. The data processing method of claim 4, wherein the extracting the operation information of the computing power service from a computing power SubTLV of the BGP-FS protocol message comprises:

extracting a mapping of a service type of the computing power service from a field of SubTLV type of the computing power SubTLV;

extracting the operation information of the computing power service from a field of value of the computing power SubTLV.

6. The data processing method of claim 5, wherein the operation information of the computing power service comprises action information scheduled based on a computing power level; the scheduling the computing power service comprises:

matching a level of the computing power service according to a field of level in the field of value of the computing power SubTLV;

matching a computing power identifier according to a field of computing power identifier in the field of value of the computing power SubTLV;

executing an action scheduled based on the computing power level according to a field of action in the field of value of the computing power SubTLV.

7. The data processing method of claim 5, wherein the operation information of the computing power service comprises action information scheduled based on a computing power region; the scheduling the computing power service comprises:

matching autonomous system according to a field of autonomous system in the field of value of the computing power SubTLV;

matching a computing power identifier according to a field of computing power identifier in the field of value of the computing power SubTLV;

executing an action scheduled based on the computing power region according to a field of action in the field of value of the computing power SubTLV.

8. The data processing method of claim 5, wherein the operation information of the computing power service comprises action information scheduled based on aggregated computing power; the scheduling the computing power service comprises:

matching an aggregated computing power identifier according to a field of aggregated computing power identifier in the field of value of the computing power SubTLV;

executing an action scheduled based on the aggregated computing power according to a field of action in the field of value of the computing power SubTLV.

9. The data processing method of claim 5, wherein the operation information of the computing power service comprises action information of a mapping from the computing power service to a network slice; the scheduling the computing power service comprises:

identifying the mapping between the computing power service and the network slice according to a field of network slice identifier in the field of value of the computing power SubTLV;

identifying a mapping between aggregated computing power and an aggregated network slice according to a field of aggregated network slice identifier in the field of value of the computing power SubTLV;

executing an action of mapping from the computing power service to the network slice according to a field of action in the field of value of the computing power SubTLV.

10. A non-transitory computer-readable medium having a computer program stored thereon, the computer program, executed by a processor, causes the processor to implement the data processing method according to claim 1.

* * * * *